(12) United States Patent
Fatehpuria et al.

(10) Patent No.: US 8,510,763 B2
(45) Date of Patent: Aug. 13, 2013

(54) CHANGING STREAMING MEDIA QUALITY LEVEL BASED ON CURRENT DEVICE RESOURCE USAGE

(75) Inventors: Pradip K. Fatehpuria, San Jose, CA (US); Vivek Thukral, Palo Alto, CA (US); Steven James Chin, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 12/815,032

(22) Filed: Jun. 14, 2010

(65) Prior Publication Data

US 2011/0307900 A1    Dec. 15, 2011

(51) Int. Cl.
   G06F 3/00    (2006.01)
   G06F 9/46    (2006.01)
   G06F 15/16   (2006.01)

(52) U.S. Cl.
   USPC ............................ 719/329; 718/104; 709/231

(58) Field of Classification Search
   None
   See application file for complete search history.

(56) References Cited

U.S. PATENT DOCUMENTS

| | | | |
|---|---|---|---|
| 6,594,699 B1 | 7/2003 | Sahai et al. | |
| 6,792,470 B2* | 9/2004 | Hakenberg et al. | 719/329 |
| 7,664,856 B2* | 2/2010 | Bowra et al. | 709/225 |
| 2003/0195977 A1* | 10/2003 | Liu et al. | 709/231 |
| 2003/0236745 A1* | 12/2003 | Hartsell et al. | 705/40 |
| 2005/0005025 A1 | 1/2005 | Harville et al. | |
| 2005/0091505 A1* | 4/2005 | Riley et al. | 713/182 |
| 2007/0083617 A1 | 4/2007 | Chakrabarti et al. | |
| 2007/0136730 A1* | 6/2007 | Wilt et al. | 718/102 |
| 2008/0133766 A1 | 6/2008 | Luo | |
| 2008/0195748 A1* | 8/2008 | Tierney et al. | 709/232 |
| 2008/0256103 A1* | 10/2008 | Fachan et al. | 707/101 |
| 2009/0300203 A1 | 12/2009 | Virdi et al. | |
| 2010/0011368 A1* | 1/2010 | Arakawa et al. | 718/104 |
| 2011/0103557 A1* | 5/2011 | Shah et al. | 379/33 |

FOREIGN PATENT DOCUMENTS

WO    0235844 A2    5/2002

OTHER PUBLICATIONS

"Performance Analysis of Home Streaming Video Using Orb", Karki, 2006, pp. 1-6.*
"Video LAN Streaming Howto", Lattre, 2005, pp. 1-65.*
"Adaptive Filters for Continuous Queries over Distributed Data Stream", Olston, 2003, pp. 1-12.*
"Cooperative Run-time Management of Adaptive Applications and Distributed Resources", Poellabauer, 2002, pp. 1-10.*
"Smooth Streaming H.264 Output Drops to Lowest Quality Stream on High Speed Connection", Retrieved at <<http://social.expression.microsoft.com/Forums/en-US/encoder/thread/503d5c0a-1fc4-4417-adc7-4750abf6f0f5 >>, Retrieved Date: Apr. 16, 2010, pp. 4.

(Continued)

Primary Examiner — Tuan Dao
(74) Attorney, Agent, or Firm — Wolfe-SBMC

(57) ABSTRACT

Streaming media is received from a source system. A current overall resource usage of a resource of the device (such as a CPU or memory of the device) is obtained. A check is made as to whether the current overall resource usage exceeds a resource threshold value. If the current overall resource usage exceeds the resource threshold value, then an indication is provided to the source system to reduce a quality level of the streaming media. The streaming media is received from the source system at the reduced quality level until there is sufficient resource capacity at the device to increase the quality level.

20 Claims, 5 Drawing Sheets

(56) References Cited

OTHER PUBLICATIONS

Dmnelson., "Smooth Streaming for IIS 7.0—Exploring Bit Rate Changes", Retrieved at <<http://learn.iis.net/page.aspx/568/smooth-streaming-for-iis-70—exploring-bit-rate-changes >>, Feb. 23, 2009, pp. 7.

"PC++ Ver Tema—Silverlight 3 Disponible", Retrieved at <<http://www.pcmasmas.com/viewtopic.php?f=88&t=33248 >>, Jul. 10, 2009, pp. 6.

"Apple's HTTP Adaptive Bitrate Streaming for iPhones and Desktops", Retrieved at <<http://www.ezsite.us/articles/41-product-reviews/89-apple-http%20article >>, Retrieved Date: Apr. 19, 2010, pp. 3.

* cited by examiner

CHANGING STREAMING MEDIA QUALITY LEVEL BASED ON CURRENT DEVICE RESOURCE USAGE

BACKGROUND

As computing technology has advanced and computers have become increasingly commonplace, streaming media such as audio/video content to computers has similarly become more commonplace. Streaming media to computers, however, can be problematic because a variety of different factors regarding the network and the computer can interfere with smooth playback of the media at the computer. This can result in a poor user experience, and user dissatisfaction with the streaming media.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, streaming media is received from a source system. A current overall resource usage of a resource of the device (such as a central processing unit or memory of the device) is obtained. A check is made as to whether the current overall resource usage exceeds a resource threshold value. If the current overall resource usage exceeds the resource threshold value, then an indication is provided to the source system to reduce a quality level of the streaming media. This obtaining of the current overall resource usage, checking whether the current overall resource usage exceeds the resource threshold value, and providing the indication to the source system is repeated while receiving the streaming media.

BRIEF DESCRIPTION OF THE DRAWINGS

The same numbers are used throughout the drawings to reference like features.

DETAILED DESCRIPTION

Changing streaming media quality level based on current device resource usage is discussed herein. Streaming media, such as audio/video content, can be transmitted from a source system to a receiver device. The source system supports multiple different levels of quality for the streaming media. During streaming, a current resource usage of the receiver device, such as current central processing unit (CPU) usage of the device, is obtained at various intervals (e.g., approximately every 6 seconds). Each time the current resource usage is obtained, if the obtained current resource usage of the device exceeds a threshold value, then the quality level of the streaming media is reduced. Additionally, after the quality level of the streaming media has been reduced, each time the current resource usage is obtained if the obtained current resource usage of the device has become low enough that the quality level of the stream media can be increased without the current resource usage of the device exceeding the threshold value, then the quality level of the streaming media is increased.

Figure 1:
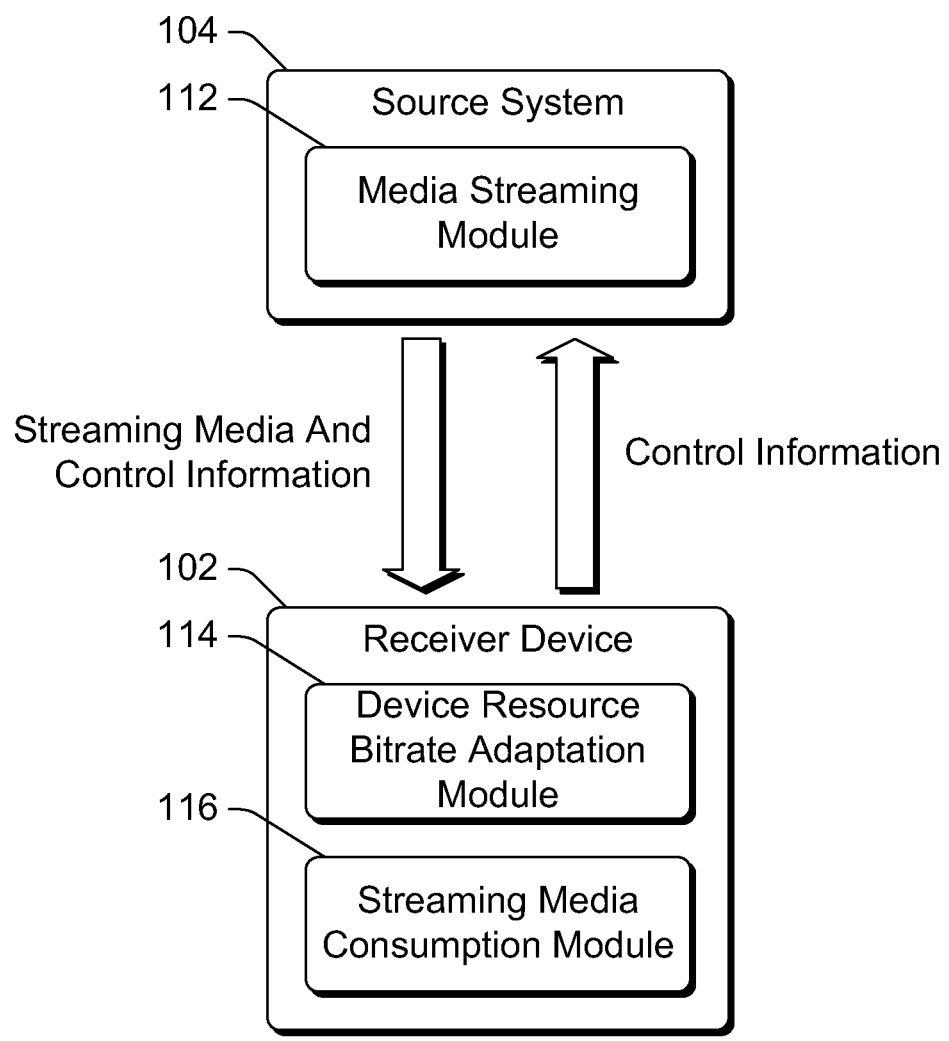
FIG. 1 illustrates an example system implementing the changing streaming media quality level based on current device resource usage in accordance with one or more embodiments.

FIG. 1 illustrates an example system 100 implementing the changing streaming media quality level based on current device resource usage in accordance with one or more embodiments. System 100 includes a receiver device 102 and a source system 104. Receiver device 102 can communicate with source system 104 over a network or other communication link. Such a network can be, for example, the Internet, a local area network (LAN), a cellular or other phone network, an intranet, a WiFi network, other public and/or proprietary networks, combinations thereof, and so forth. Such other data communication links can be wired and/or wireless links, such as a Universal Serial Bus (USB) link, wireless USB link, radio frequency (RF) link, other public and/or proprietary communication links, combinations thereof, and so forth.

Receiver device 102 can be a variety of different types of devices. For example, receiver device 102 can be a desktop computer, a laptop or netbook computer, a notepad or tablet computer, a mobile station, an entertainment appliance, a television, a set-top box communicatively coupled to a display device, a cellular or other wireless phone, a game console, an automotive computer, and so forth. Source system 104 can also be one or more of a variety of different types of computing devices, analogous to receiver device 102. Source system 104 can be implemented using one or more of the same types of devices as receiver device 102 and/or different types of devices.

Source system 104 includes a media streaming module 112 that streams media to receiver device 102. The media can be any type of media content that can be played back, recorded, or otherwise consumed by receiver device 102. For example, the media can be audio content, video content, audio/video content, and so forth. Streaming media refers to transmitting media to receiver device 102 as the media is played back or otherwise consumed by receiver device 102 (including optionally having some buffering on receiver device 102), rather than sending one or more files with the media content and playing back the content from the one or more files after the one or more files have been received in their entirety.

Source system 104 can maintain a database or other store of media that can be streamed to receiver device 102. Alternatively, source system 104 can obtain media from another device or service. The media can be previously generated and stored content, such as movies, television programs, songs, and so forth stored as files on a storage device. Alternatively, the media can be live content that source system 104 creates and streams to receiver device 102 at approximately the same time as an event is occurring, such as live news broadcasts, live sporting events, and so forth. It is to be appreciated that although referred to as live content, various delays can be incurred when capturing and creating live events. Thus, the streaming may occur some amount of time (e.g., 30 seconds, 60 seconds, etc.) after the live event has actually occurred.

Receiver device 102 includes a device resource bitrate adaptation module 114 and a streaming media consumption module 116. Modules 114 and 116 can be separate modules as illustrated or alternatively can be combined (e.g., device resource bitrate adaptation module 114 can be implemented as part of streaming media consumption module 116). Streaming media consumption module 116 receives the streaming media from source system 104 and manages consumption of the streaming media on receiver device 102. Consumption of streaming media refers to operating on or processing the streaming media in some manner, such as playing back the streaming media, recording the streaming media and so forth.

Media streaming module 112 and streaming media consumption module 116 support adaptive media streaming. Adaptive media streaming refers to the ability to stream the media from source system 104 to receiver device 102 at different bitrates. These different bitrates are associated with different quality levels, with higher bitrates typically being associated with higher quality levels. Media can be pre-encoded at these different bitrates and stored as different versions of the media (e.g., as separate files), in which case media streaming module 112 can obtain and stream an appropriate one of the versions based on the desired quality level. Alternatively, the media can be encoded at different bitrates on-the-fly or as needed, thus alleviating the need to pre-encode and store different versions of the media. Such on-the-fly encoding can be performed by media streaming module 112, another module of source system 104, or alternatively some other device or module. In one or more embodiments, the adaptive media streaming uses Smooth Streaming technology available from Microsoft Corporation of Redmond, Wash., although other technologies can alternatively be used.

When streaming media content from source system 104 to receiver device 102, device resource adaptation module 114 checks whether a current overall resource usage (e.g., CPU or memory usage) of receiver device 102 exceeds a threshold value. Although the discussions herein refer to usage exceeding a threshold value, it is to be appreciated that the techniques discussed herein can analogously apply to usage equaling or otherwise satisfying a threshold value. The current overall resource usage of a particular resource refers to the usage of that particular resource by any entity (e.g., any component, modules, and so forth of receiver device 102). These checks are performed at various intervals while device 102 receives the streaming media. If a check indicates that the current overall resource usage exceeds the threshold value, then device resource bitrate adaptation module 114 sends an indication in control information to source system 104 to reduce the quality level of the streaming media. In response to the indication, media streaming module 112 continues streaming the streaming media to receiver device 102 but at a lower quality level (assuming there is a lower quality level). If, on the other hand, after the quality level of the streaming media has been reduced, a check indicates that the current resource usage of receiver device 102 has become low enough that the quality level of the streaming media can be increased without the current resource usage of the device exceeding the threshold value, then device resource bitrate adaptation module 114 sends an indication in control information to source system 104 to increase the quality level of the streaming media. The quality level of the streaming media can be changed multiple times while receiving the streaming media, including both reducing and increasing the quality level of the streaming media.

A single source system 104 and a single receiver device 102 are illustrated in FIG. 1. However, it is to be appreciated that multiple source systems 104 and/or multiple receiver devices 102 can be included in system 100. Multiple source systems 104 can stream the same and/or different streaming media (at the same and/or different quality levels) to one or more receiver devices 102 concurrently. Additionally, multiple receiver devices 102 can receive the same and/or different streaming media (at the same and/or different quality levels) from one or more source systems 104 concurrently. Furthermore, a single receiver device 102 can receive multiple different streaming media (at the same and/or different quality levels) concurrently from one or more source systems 104.

Figure 2:
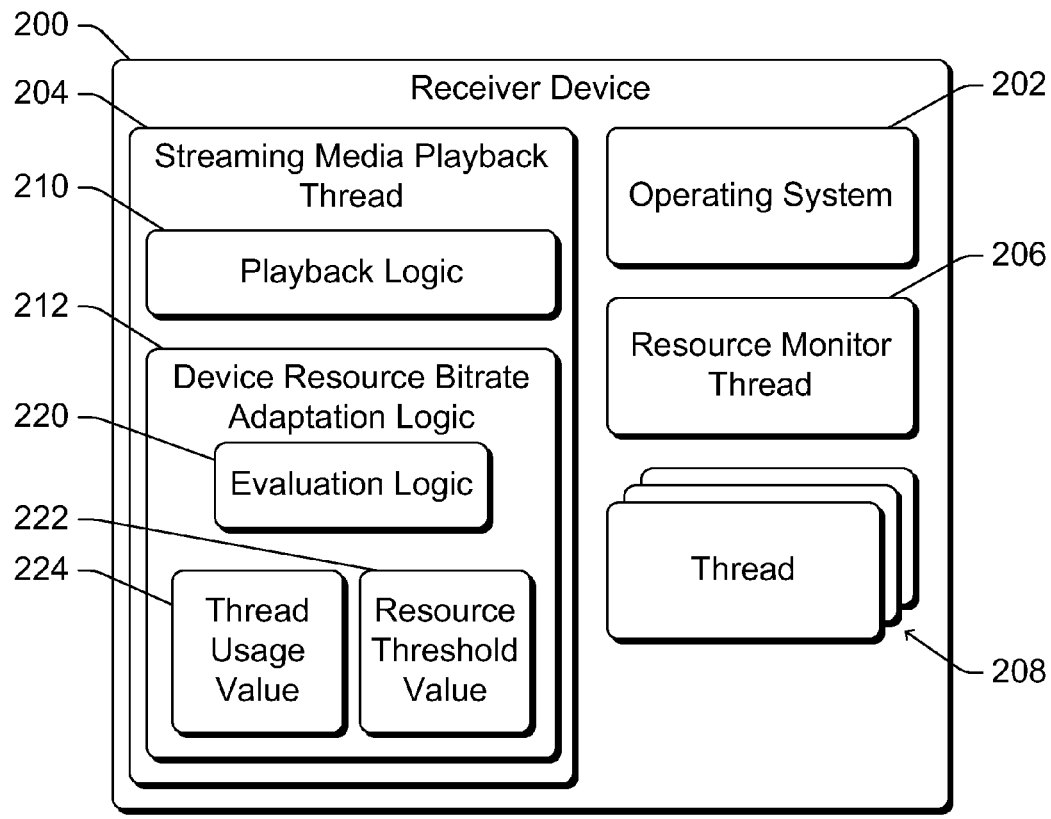
FIG. 2 illustrates an example receiver device implementing the changing streaming media quality level based on current device resource usage in accordance with one or more embodiments.

FIG. 2 illustrates an example receiver device 200 implementing the changing streaming media quality level based on current device resource usage in accordance with one or more embodiments. Receiver device 200 can be, for example, a receiver device 102 of FIG. 1. Receiver device 200 includes an operating system 202 that is typically software and/or firmware executed by one or more processors of receiver device 200. Operating system 202 manages various operations of receiver device 200, and can manage execution of one or more additional programs on device 200. Receiver device 200, when running, also includes a streaming media playback thread 204, a resource monitor thread 206, and one or more additional threads 208. Each of threads 204, 206, and 208 can be threads of operating system 202 or alternatively threads of one or more other programs run by operating system 202. Additionally, although discussed herein as threads, it should be noted that one or more of threads 204, 206, and 208 can each be implemented as a process or other component, and can alternatively be implemented at least in part in hardware. In such situations, the changing streaming media quality level based on current device resource usage techniques discussed herein as applying to threads apply analogously to such a process or other component.

Streaming media playback thread 204 manages various aspects of streaming media playback by receiver device 200. Streaming media playback thread includes playback logic 210 and device resource bitrate adaptation logic 212. Playback logic 210 manages the receipt and playback of streaming media by receiver device 200. This playback can include playback of streaming media on device 200 itself (e.g., playing audio content on speakers of receiver device 200, displaying video content on a screen of receiver device 200, etc.). This playback can also, or alternatively, include providing signals to one or more other components or devices that play the media (e.g., one or more speakers coupled to receiver device 200 to play audio content, a television coupled to receiver device 200 to display video content, etc.).

Device resource bitrate adaptation logic 212 can be, for example, a device resource bitrate adaptation module 114 of FIG. 1. Device resource bitrate adaptation logic 212 adapts the quality level of streaming media received at receiver device 200 based at least in part on a current resource usage of receiver device 200, as discussed in more detail below. This adaptation is performed by indicating, to the source system from which the streaming media is received, to change (e.g., reduce or increase) the quality level of the streaming media. Although device resource bitrate adaptation logic 212 is illustrated as being part of streaming media playback thread 204, alternatively the two can be separate. For example, device resource bitrate adaptation logic 212 can be implemented as its own thread separate from streaming media playback thread 204.

One or more additional threads 208 can also be included in receiver device 200. One or more of these additional threads 208 can be related to streaming media, such as one or more additional streaming media playback threads, one or more threads to record or otherwise store streaming media, one or more threads to display an electronic programming guide thread that displays various streaming media that can be received by receiver device 200, one or more threads to edit streaming media editing, and so forth. One or more of these additional threads 208 can also be unrelated to streaming media, such as one or more threads providing word processing functionality, one or more threads providing spreadsheet functionality, one or more threads providing email or texting functionality, one or more threads providing voice calling functionality, one or more threads providing video game functionality, and so forth.

Resource monitor thread 206 monitors the resource usage of one or more resources of receiver device 200 and provides the current resource usage of those one or more resources of receiver device 200 when requested. This resource usage of a resource of receiver device 200 refers to usage of a particular resource of receiver device 200 rather than a network or communication link coupled to receiver device 200. Resource monitor thread 206 monitors overall usage of the resource in receiver device 200, which is the usage of that resource in receiver device 200 by all entities in receiver device 200 (e.g., by all threads running in receiver device 200). Resource monitor thread 206 also monitors the usage of the resource on a per thread basis. The current overall resource usage, the current resource usage by a particular thread, or combinations thereof at the time a request is received are provided by resource monitor thread 206 to the requester. It should be noted that resource monitor thread 206 need not be a separate thread, and that the monitoring performed by resource monitor thread 206 can alternatively be performed by one or more other threads. For example, the monitoring performed by resource monitor thread 206 could be performed by streaming media playback thread 204, resource monitor thread 206 can be included as part of operating system 202, and so forth.

Resource monitor thread 206 can be continuously running during operation of receiver device 200, or alternatively can run in response to certain events such as a request from another thread of receiver device 200. For example, resource monitor thread 206 can be run by operating system 202 in response to a request from device resource bitrate adaptation logic 212 of thread 204 for the current resource usage of a resource of device 200. After returning the current resource usage of the resource of device 200 to device resource bitrate adaptation logic 212, operating system 202 can terminate running of resource monitor thread 206.

Device resource bitrate adaptation logic 212 includes evaluation logic 220 that checks whether a current overall resource usage of a resource of receiver device 102 exceeds a resource threshold value 222. This resource usage of a resource of receiver device 102 refers to a resource (e.g., a physical resource) of receiver device 102 rather than a network or communication link coupled to or otherwise in communication with receiver device 200. For example, such a resource of device 200 can be one or more CPUs, one or more CPU cores, volatile memory, nonvolatile memory, combinations thereof, and so forth.

Device resource bitrate adaptation logic 212 maintains a resource threshold value 222 that can have a variety of different values. In one or more embodiments the threshold value is configurable and can be changed by, for example, a user or administrator of receiver device 200, another component or device, and so forth. The threshold value can be a fixed value (e.g., a particular number of instructions per second being executed, a particular number of bytes of memory being used, etc.) or a relative value (e.g., 75% of a maximum number of instructions per second, 80% of the total amount of memory, etc.).

Device resource bitrate adaptation logic 212 checks whether the current overall resource usage of a resource of receiver device 200 exceeds the resource threshold value 222 at regular and/or irregular intervals while receiver device 200 is receiving the streaming media. The current overall resource usage of a resource of receiver device 200 is obtained from resource monitor thread 206. For example, device resource bitrate adaptation logic 212 can perform the check every 5 or 6 seconds, every 12 or 13 seconds, and so forth. By way of another example, device resource bitrate adaptation logic 212 can perform the check in response to other events, such as execution of another thread beginning (e.g., determined based on a notification received from operating system 202), execution of another thread terminating (e.g., determined based on a notification received from operating system 202), a notification received from the source of the streaming media (e.g., source system 104 of FIG. 1), and so forth. By way of yet another example, device resource bitrate adaptation logic 212 can perform the check in response to a particular event, such as execution of another thread beginning, and not perform the check again until execution of that other thread terminates. By way of still another example, device resource bitrate adaptation logic 212 can perform the check at a first interval (e.g., every 5 or 6 seconds) when a particular other process or program (e.g., a process or program having a particular identity, as determined based on a notification received from operating system 202) is not executing, and at a second interval (e.g., every 30 or 35 seconds) when the particular other process or program is executing.

Device resource bitrate adaptation logic 212 also maintains a thread usage value 224. Thread usage difference value 224 refers to the current usage of the resource by streaming media playback thread 204. Thread usage value 224 can be determined by evaluation logic 220 in a variety of different manners. In one or more embodiments, evaluation logic 220 obtains from resource monitor thread 206 the current usage of the resource by streaming media playback thread 204. Alternatively, evaluation logic 220 can determine thread usage value 224 in different manners, such as by obtaining from resource monitor thread 206 the current overall usage of the resource as well as the current thread specific usage for the other threads (other than streaming media playback thread 204) running on receiver device 200. The difference between the current overall usage of the resource and the current thread specific usage for the other threads running on receiver device 200 is the thread usage value 224.

Thread usage value 224 can be generated at different times and/or in response to different events. In one or more embodiments, thread usage value 224 is generated each time evaluation logic 220 determines that the current resource usage of a resource of receiver device 200 exceeds the resource threshold value 222. This allows evaluation logic 220 to maintain a record of an approximation of an amount of resource usage of streaming media playback thread 204 at the time thread usage value 224 is determined. This record can be used to determine when to increase the quality level of the streaming media, as discussed in more detail below.

In one or more embodiments, a single thread usage value 224 is maintained by evaluation logic 220. Each time a new thread usage value 224 is generated the new thread usage value 224 replaces the previous thread usage value 224. Alternatively, the first thread usage value when reducing the quality level of the streaming media is saved but subsequent thread usage values are not saved (optionally until the quality level of the streaming media is increased, after which the first thread usage value when next reducing the quality level of the streaming media is saved). Alternatively, evaluation logic 220 can maintain multiple thread usage values 224. Evaluation logic 220 can also optionally maintain an association between each of multiple thread usage values and a particular quality level of streaming media that was being received at the time the thread usage value was generated. This association allows evaluation logic 220 to maintain a record of approximate resource usage for each of multiple different quality levels of streaming media.

Figure 3:
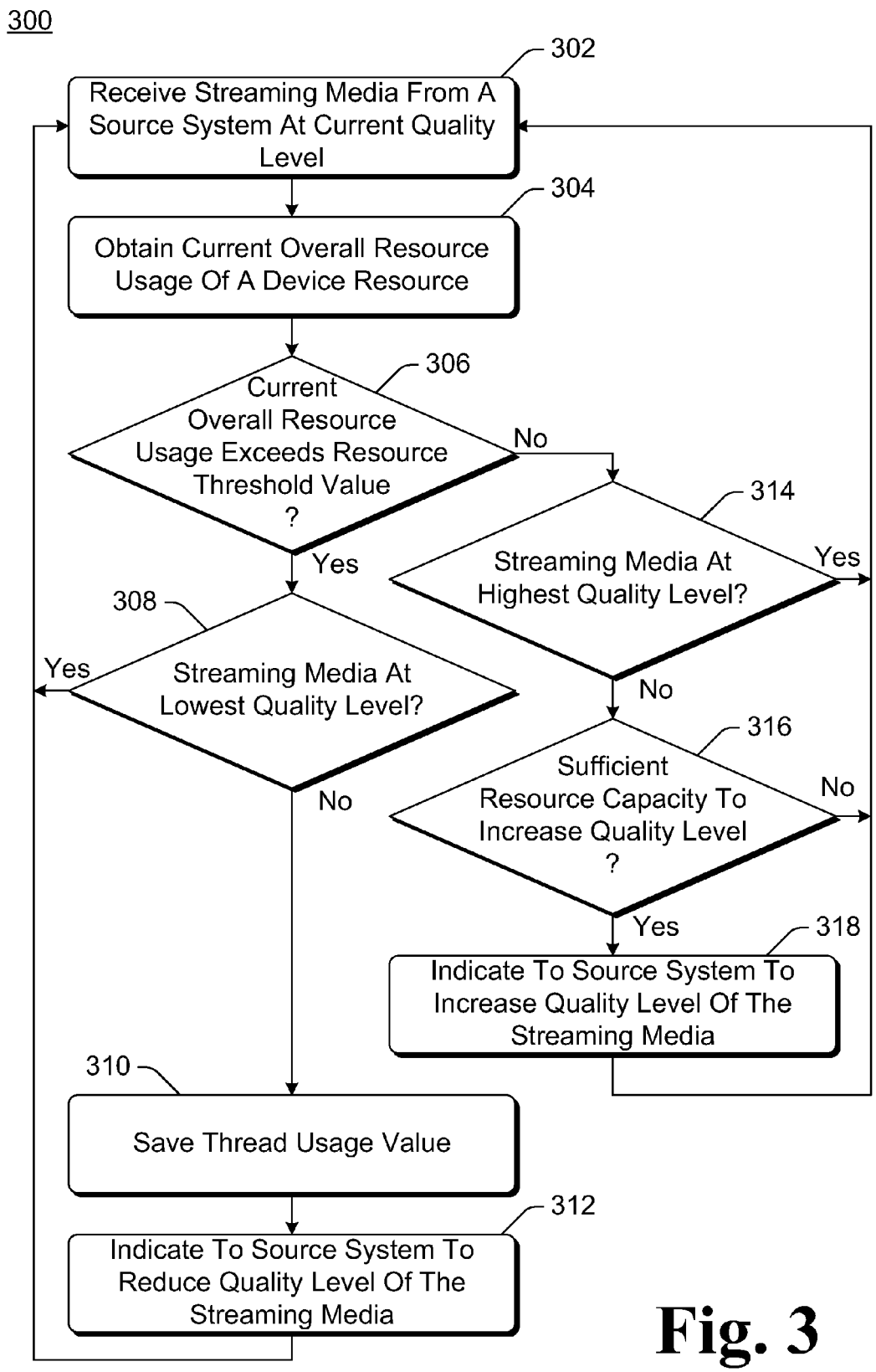
FIG. 3 is a flowchart illustrating an example process for changing streaming media quality level based on current device resource usage in accordance with one or more embodiments.

FIG. 3 is a flowchart illustrating an example process 300 for changing streaming media quality level based on current device resource usage in accordance with one or more embodiments. Process 300 is carried out by a device resource bitrate adaptation module, such as device resource bitrate adaptation module 114 of FIG. 1 or device resource bitrate adaptation logic 212 of FIG. 2, and can be implemented in software, firmware, hardware, or combinations thereof. The device resource bitrate adaptation module is implemented on a device, such as receiver device 102 of FIG. 1 or receiver device 200 of FIG. 2, and references to the device in process 300 refer to the device on which the device resource bitrate adaptation module is implemented. Process 300 is shown as a set of acts and is not limited to the order shown for performing the operations of the various acts. Process 300 is an example process for changing streaming media quality level based on current device resource usage; additional discussions of changing streaming media quality level based on current device resource usage are included herein with reference to different figures.

In process 300, streaming media is received from a source system at a current quality level (act 302). As discussed above, the streaming media can have a variety of different quality levels ranging from a lowest quality level to a highest quality level. Different bitrates are associated with different quality levels, with lower bitrates typically being associated with lower quality levels. The current quality level refers to the one of the different quality levels of the streaming media that is currently being received by the device. An initial current quality level (e.g., the first quality level used for the streaming media) can be identified in different manners, such as based on a default configuration value, using a default quality level set by the source system, based on a quality level requested by a user of the device, and so forth.

It should be noted that different streaming media can have different quality levels and/or ranges of quality levels. For example, one particular program of audio/video content may be encoded in five different quality levels, such as 6.5 Mbps (megabits per second), 5.5 Mbps, 4 Mbps, 3 Mbps, and 1.5 Mbps. Another program of audio/video content, however, may be encoded in three different quality levels, such as 6.5 Mbps, 5.5 Mbps, and 4.5 Mbps.

The different quality levels for particular streaming media can be referred to as having a particular sequence or order, ranging for example from highest to lowest quality level (or lowest to highest quality level). Reducing the quality of the streaming media by one level refers to reducing the streaming media from the current level to the next lower level in this particular sequence or order. Similarly, increasing the quality of the streaming media by one level refers to increasing the streaming media from the current level to the next higher level in this particular sequence or order. For example, assume one particular program of audio/video content is encoded in five different quality levels and that the particular order is (from highest to lowest): 6.5 Mbps, 5.5 Mbps, 4 Mbps, 3 Mbps, and 1.5 Mbps. If the current level were 5.5 Mbps, then reducing the quality of the streaming media by one level refers to lowering the streaming media to 4 Mbps, and increasing the quality of the streaming media by one level refers to increasing the streaming media to 6.5 Mbps.

After a particular amount of time elapses and/or in response to a particular event, a current overall resource usage of a device resource is obtained (act 304). The device resource can be a variety of different resources, as discussed above, and the various references to resource usage in process 300 refer to the usage of the same particular resource. For example, the various references to resource usage in process 300 can refer to CPU usage in the device. Various additional resource usage information can also be obtained in act 304, such as the current resource usage of the streaming media playback thread that is managing streaming media playback for the device, the current resource usage of the other threads (other than the streaming media playback thread that is managing streaming media playback for the device) running on the device, and so forth.

A check is made as to whether the current overall resource usage exceeds a resource threshold value (act 306). This current overall resource usage is the current overall resource usage obtained in act 304. The resource threshold value can be a variety of different values as discussed above.

If the current overall resource usage exceeds the resource threshold value, then a check is made as to whether the streaming media is at the lowest quality level (act 308). The determination of whether the streaming media is at the lowest quality level can be made in different manners, based at least in part on the adaptive media streaming technology being used for the streaming media.

If the streaming media is at the lowest quality level then process 300 returns to act 302, continuing to receive the streaming media from the source system at the current quality level. Although the resource threshold value was met, the quality level of the streaming media is not lowered because the streaming media is already at the lowest quality level. Thus, the streaming media continues to be received at the current quality level. Alternatively, rather than continuing to receive the streaming media at the current quality level other actions can be taken, such as shutting down (terminating) receiving of the streaming media, pausing playback of the streaming media (e.g., to allow a buffer for the streaming media to be filled), and so forth.

However, if the streaming media is not at the lowest quality level, then the thread usage value is saved (act 310). The thread usage value refers to the current resource usage of the streaming media playback thread that is managing streaming media playback for the device. The thread usage value can be obtained, for example, concurrently with obtaining the overall resource usage of the device in act 304. This thread usage value is, for example, thread usage value 224 of FIG. 2.

Additionally, an indication is communicated to the source system to reduce the quality level of the streaming media (act 312). This indication can take a variety of different forms. If the device is configured with or otherwise has access to both the different quality levels that are available for the streaming media and the current quality level, then the device can select the quality level to which the streaming media is reduced. Alternatively, or if the device has no knowledge of the different quality levels that are available for the streaming media and/or the current quality level, the device can send a request to the source system to reduce the quality level. The source system receives the indication to reduce the quality level of the streaming media and responds by reducing the quality level of the streaming media.

In one or more embodiments, in act 312 the quality level of the streaming media is reduced by one level within the particular sequence or order of quality levels for the streaming media. Alternatively, the quality level of the streaming media can be reduced multiple levels in act 312.

Process 300 then returns to act 302, continuing to receive the streaming media from the source system at the current quality level. The current quality level, however, is now a lower quality level because the quality level was reduced in act 312.

It should be noted that process 300 can repeat through steps 302-312 multiple times, continuing to reduce the quality level of the streaming media until either the current overall resource usage no longer exceeds the resource threshold value in act 306 or the streaming media is at the lowest quality level in act 308. In one or more embodiments, one thread usage value is saved in act 310, so each time the quality level of the streaming media is reduced the previous thread usage value is overwritten in act 310. Alternatively, multiple thread usage values can be saved in act 310 along with an association between the thread usage value and the current quality level at the time the thread usage value is obtained (e.g., just prior to reducing the quality level of the streaming media).

Returning to act 306, if the current overall resource usage does not exceed the resource threshold value, then a check is made as to whether the streaming media is at the highest quality level (act 314). The determination of whether the streaming media is at the highest quality level can be made in different manners, based at least in part on the adaptive media streaming technology being used for the streaming media.

If the streaming media is at the highest quality level then process 300 returns to act 302, continuing to receive the streaming media from the source system at the current quality level. Although there is sufficient resource capacity to increase the quality level of the streaming media, the quality level of the streaming media is not increased because the streaming media is already at the highest quality level. Thus, the streaming media continues to be received at the current quality level.

However, if the streaming media is not at the highest quality level, then a check is made as to whether there is sufficient resource capacity to increase the quality level (act 316). Whether there is sufficient resource capacity to increase the quality level can be determined in different manners. In one or more embodiments, the current resource usage of all threads running in the device other than the streaming media playback thread that is managing streaming media playback is obtained (e.g., concurrently with obtaining the current overall resource usage of the device in act 304). An expected resource usage value is then calculated by adding the current resource usage of all threads running in the device other than the streaming media playback thread to what the resource usage of the streaming media playback thread was prior to the reduction in quality level of the streaming media (as was previously saved in act 310). The expected resource usage value indicates what the current resource usage is expected to be if the quality level of the streaming media were increased. The expected resource usage value can then be compared to the resource threshold value, and if the expected resource usage value does not exceed the threshold value then there is sufficient resource capacity to increase the quality level.

In one or more embodiments, a filter or buffer is added to the check in act 316 in order to avoid the situation of repeatedly going back and forth between determining that the overall resource usage exceeds the resource threshold value and determining that the overall resource usage does not exceed the resource threshold value in act 306 in consecutive (or otherwise close) passes through process 300. This can be accomplished in different manners, such as by using a different threshold value in act 316 than the threshold value used in act 306 (e.g., a threshold value in act 316 that is 2% or 3% more than the threshold value used in act 306). Alternatively, this can be accomplished by adding a filter or buffer value (e.g., 2% or 3%) to increase the expected resource usage value. The filter or buffer value could be added to the expected resource usage value itself or to one of the values used to obtain the expected resource usage value.

For example, assume that the device resource is a CPU and the resource threshold value is 70%. In one pass through process 300, assume that the current overall CPU usage is 75% and that the CPU usage of the streaming media playback thread is 25%. Accordingly, the 25% value is saved as the thread usage value (in act 310) and the quality level of the streaming media is reduced (in act 312). In a next pass through process 300, assume that the current overall CPU usage has dropped to 64% and that the CPU usage of the streaming media playback thread is 20%. Thus, the current CPU usage of all threads running in the device other than the streaming media playback thread is 44% (64% minus 20%), and the expected CPU usage value would be 69% (44% plus the previously saved 25%). If no filter or buffer were to be used in act 316, then there would be sufficient resource capacity to increase the quality level. However, if a 3% filter or buffer were used in act 316, then the expected CPU usage value would be 72% (or the threshold value used in act 316 would be 67%), and there would not be sufficient resource capacity to increase the quality level.

In one or more embodiments, a single thread usage value is maintained (saved in act 310) as discussed above. In such embodiments, this single saved value is used in determining whether there is sufficient resource capacity to increase the quality level in act 316. Alternatively, multiple thread usage values can be maintained for different quality levels as discussed above. In such embodiments, in act 316 the thread usage value associated with the increased quality level of the streaming media (the quality level to which the streaming media would be increased if there is sufficient resource capacity) is the thread usage value used in determining whether there is sufficient resource capacity to increase the quality level in act 316.

Alternatively, act 316 may be performed only if the current quality level is below a desired quality level, which refers to the level that was the current quality level before a reduction in quality level was indicated in act 312. The desired quality level is, for example, the initial quality level at which the streaming media was received. If the current quality level is not below the desired quality level, then process 300 can return to act 302 to continue to receive the streaming media from the source system at the current quality level. As the current quality level is not below (e.g., is at) the desired quality level, there is no need to check whether to increase the quality level.

If there is not sufficient resource capacity to increase the quality level, then process 300 returns to act 302, continuing to receive the streaming media from the source system at the current quality level.

However, if there is sufficient resource capacity to increase the quality level, then an indication is communicated to the source system to increase the quality level of the streaming media (act 318). This indication can take a variety of different forms. If the device is configured with or otherwise has access to both the different quality levels that are available for the streaming media and the current quality level, then the device can select the quality level to which the streaming media is increased. Alternatively, or if the device has no knowledge of the different quality levels that are available for the streaming media and/or the current quality level, the device can send a request to the source system to increase the quality level. The source system receives the indication to increase the quality level of the streaming media and responds by increasing the quality level of the streaming media.

In one or more embodiments, in 318 the quality level of the streaming media is increased by one level within the particular sequence or order of quality levels for the streaming media. Alternatively, the quality level of the streaming media can be increased multiple levels in act 318.

The acts of process 300 are repeated multiple times while streaming media is being received. When receipt of the streaming media has stopped, or paused, process 300 can similarly stop or pause until receipt of the streaming media resumes.

It should be noted that in various embodiments one or more of the acts in process 300 need not be performed. For example, in one or more embodiments, acts 308 and 314 need not be performed. Rather, an indication can be sent to the source system to reduce (or increase) the quality level of the streaming media even if the quality level is already at the lowest (or highest) quality level. By way of another example, in one or more embodiments one or more flag values can be set to indicate when the quality level of the streaming media is at the lowest (or highest) quality level. If one or more flag values indicate that the quality level of the streaming media is at the lowest (or highest) quality level, then acts 308, 310, and 312 (or 314, 316 and 318) need not be performed.

Additionally, in one or more embodiments the device resource bitrate adaptation module implementing process 300 maintains a record of the thread usage value for each of the different quality levels that it encounters for particular streaming media. These different quality levels would be the quality levels that are, at some time during receiving the streaming media, the current quality level. This record allows the device resource bitrate adaptation module to determine whether the quality level of the streaming media is to be reduced (or increased) one level or multiple levels. For example, if the device resource bitrate adaptation module determines that, based on the current overall resource usage threshold and this record of thread usage values, reducing the quality level of the streaming media by one level would still result in the resource threshold value being met, then the quality level of the streaming media can be reduced multiple levels. By way of another example, if the device resource bitrate adaptation module determines that, based on the current overall resource usage threshold and this record of thread usage values, increasing the quality level of the streaming media by two levels would still result in the resource threshold value not being met, then the quality level of the streaming media can be increased two levels.

Process 300 is discussed with reference to a device resource. However, it should be noted that process 300 can be used with multiple device resources. A combined value representing all of the multiple device resources could be generated and used as resource usage in process 300, such as by averaging or adding together the resource usage values of the multiple device resources. Alternatively, different acts of process 300 can be repeated for each of the multiple device resources. For example, current overall resource usage for each of the multiple devices can be obtained in act 304 and each of these current overall resource usages can be compared to different resource threshold values. In such embodiments, the quality level of the streaming media is reduced if one or more of the current overall resource usages exceed their respective threshold values in act 306, but there is sufficient capacity to increase the quality level only if there is sufficient resource capacity for all of the multiple device resources to increase the quality in act 316.

Thus, it can be seen that a particular quality level of streaming media is streamed to the receiver device. If the current overall resource usage of a device resource becomes too high (e.g., exceeds the resource threshold value), then the quality level of the streaming media is reduced until the lowest quality level is being streamed or the current overall resource usage of the device resource is no longer too high. The streaming media continues to be streamed at this reduced level until there is sufficient resource capacity to increase the quality level, at which point the quality level is increased.

Process 300 is discussed with reference to using the resource usage of a device resource independently to determine whether (and when) to reduce or increase the quality level of the streaming media. Alternatively, the resource usage of a device resource can be used in conjunction with one or more other techniques to determine a quality level of streaming media. For example, the resource usage of a device resource can be used to set a cap or maximum quality level for the streaming media, but the quality level of the streaming media can be further reduced based on other factors external to the device (such as network bandwidth).

Figure 4:
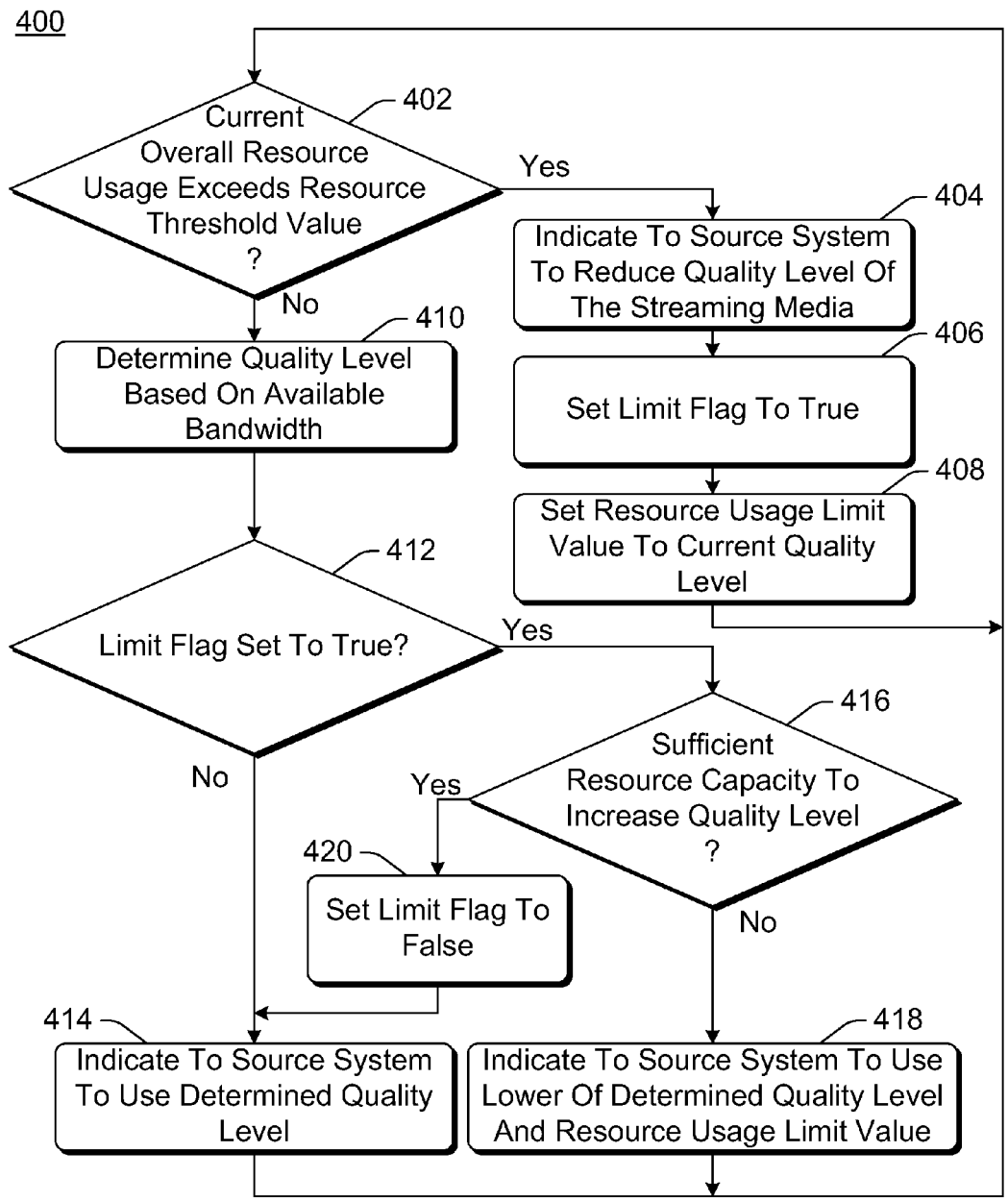
FIG. 4 is a flowchart illustrating another example process for changing streaming media quality level based on current device resource usage in accordance with one or more embodiments.

FIG. 4 is a flowchart illustrating another example process 400 for changing streaming media quality level based on current device resource usage in accordance with one or more embodiments. Process 400 illustrates an example of the resource usage of a device resource being used in conjunction with one or more other techniques to determine a quality level of streaming media. Process 400 is carried by a device (e.g., a streaming media playback thread of the device), such as receiver device 102 of FIG. 1 or receiver device 200 of FIG. 2, and references to the device in process 400 refer to the device on which process 400 is implemented. Process 400 can be implemented in software, firmware, hardware, or combinations thereof. Process 400 is an example process for changing streaming media quality level based on current device resource usage; additional discussions of changing streaming media quality level based on current device resource usage are included herein with reference to different figures.

In process 400, a check is made as to whether the current overall resource usage of a resource of the device exceeds a resource threshold value (act 402). This check is analogous to the check in act 306 discussed above with reference to FIG. 3

If the current overall resource usage of the device resource exceeds the resource threshold value, then an indication is communicated to the source system to reduce the quality level of the streaming media (act 404). This indication is analogous to the indication in act 312 discussed above with reference to FIG. 3. If the quality level of the streaming media is at the lowest quality level, then the indication in act 404 need not be sent.

Additionally, a limit flat is set to true (act 406). The limit flag being set to true indicates that the quality level of the streaming media is being reduced due to the current overall resource usage of the device resource exceeding the resource threshold value.

A resource usage limit value is also set to a current quality level (act 408). This resource usage limit value operates as a cap or maximum quality level for the streaming media, although the quality level of the streaming media can be further reduced based on network bandwidth as discussed in more detail below. The current quality level in act 408 can be the quality level before being reduced in act 404 or the quality level after being reduced in act 404.

Process 400 then returns to act 402, where a check is again made as to whether the current overall resource usage of the device resource exceeds a resource threshold value. The check in act 402 can be made at regular and/or irregular intervals, and/or in response to various events as discussed above.

If, in act 402, the current overall resource usage of the device resource does not exceed the resource threshold value, then a quality level for the streaming media is determined based on available bandwidth (act 410). This bandwidth refers to bandwidth on the network and/or other communication link via which the device receives the streaming media. A variety of different conventional available bandwidth determination techniques can be used to determine an amount of available bandwidth on the network and/or other communication link. The quality level of the streaming media is determined based on the available bandwidth by selecting, for example, the highest quality level of the streaming media that can be received in the available bandwidth (e.g., having a bitrate that is less than or equal to the available bandwidth).

A check is then made as to whether the limit flag is set to true (act 412). If the limit flag is not set to true, then the quality level of the streaming media is not being reduced due to the current overall resource usage of the device resource exceeding the resource threshold value. Accordingly, an indication is communicated to the source system to use the determined quality level of the streaming media (act 414), which is the quality level determined in act 410.

Process 400 then returns to act 402, where a check is again made as to whether the current overall resource usage of the device resource exceeds a resource threshold value.

Returning to act 412, if the limit flag is set to true, then a check is made as to whether there is sufficient resource capacity of the device resource to increase the quality level (act 416). This check is analogous to the check in act 316 discussed above with reference to FIG. 3.

If there is not sufficient resource capacity of the device resource to increase the quality level, then an indication is communicated to the source system to use (act 418) the lower of the quality level of the streaming media determined in act 410 and the resource usage limit value set in act 408. Process 400 then returns to act 402, where a check is again made as to whether the current overall resource usage of the device resource exceeds a resource threshold value.

However, if there is sufficient resource capacity of the device resource to increase the quality level, in one or more embodiments the limit flat is set to false (act 420). The quality level of the streaming media need no longer be reduced due to the current overall resource usage of the device resource exceeding the resource threshold value because there is sufficient resource capacity of the device resource to increase the quality level. An indication is communicated to the source system to use (act 414) the quality level of the streaming media determined in act 410. Process 400 then returns to act 402, where a check is again made as to whether the current overall resource usage of the device resource exceeds a resource threshold value.

In other embodiments, if there is sufficient resource capacity of the device resource to increase the quality level, then a check is made as to whether increasing the streaming media by one level would result in the streaming media being at the highest quality level. If increasing the streaming media by one level would result in the streaming media being at the highest quality level, then the limit flat is set to false (act 420) and an indication is communicated to the source system to use (act 414) the quality level of the streaming media determined in act 410. However, if increasing the streaming media by one level would not result in the streaming media being at the highest quality level, then an indication is sent to the source system to increase the quality level of the streaming media. This indication is analogous to the indication in act 318 discussed above with reference to FIG. 3. The resource usage limit value is also set to the current quality level (analogous to act 408), and an indication is communicated to the source system to use (act 418) the lower of the quality level of the streaming media determined in act 410 and the newly set resource usage limit value.

Process 400 is discussed as performing acts 404, 406, and 408 if the current overall resource usage exceeds the resource threshold value in act 402. Alternatively, acts 404, 406, and 408 need not be performed if the quality level of the streaming media is already at a lowest quality level. Rather, if the quality level of the streaming media is already at a lowest quality level, then process 400 can simply return to act 402 without performing acts 404, 406, and 408.

Additionally, process 400 is discussed with reference to a device resource. However, it should be noted that, analogous to process 300 of FIG. 3, process 400 can be used with multiple device resources.

Figure 5:
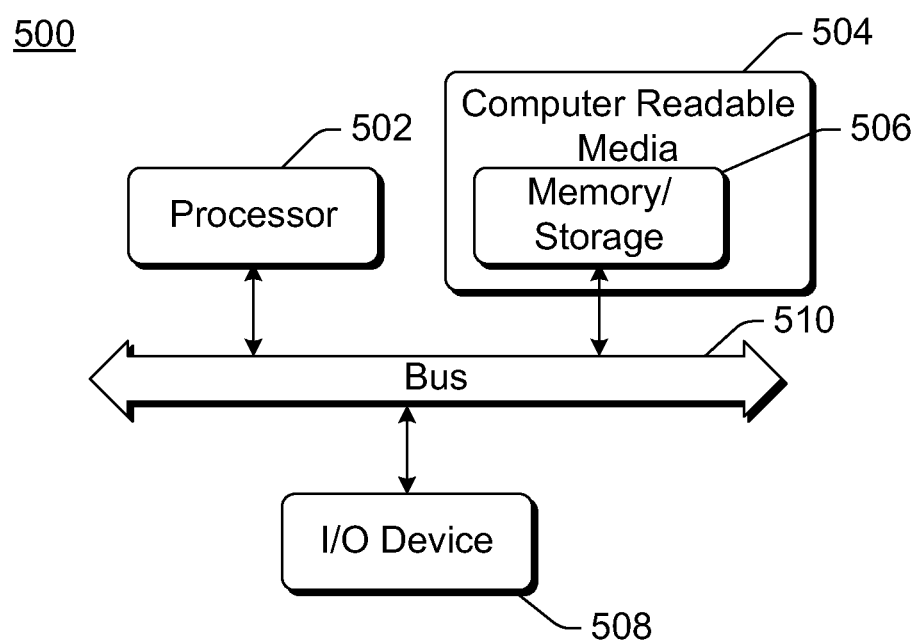
FIG. 5 illustrates an example computing device that can be configured to implement the changing streaming media quality level based on current device resource usage in accordance with one or more embodiments.

FIG. 5 illustrates an example computing device 500 that can be configured to implement the changing streaming media quality level based on current device resource usage in accordance with one or more embodiments. Computing device 500 can be, for example, a receiver device 102 of FIG. 1 or receiver device 200 of FIG. 2, or can implement at least part of source system 104.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the changing streaming media quality level based on current device resource usage techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a device, the method comprising:
   receiving streaming media from a source system;
   obtaining a current overall resource usage of a resource of the device;
   checking whether the current overall resource usage exceeds a resource threshold value;
   indicating, to the source system, to reduce a quality level of the streaming media from a current quality level if the current overall resource usage exceeds the resource threshold value;
   and repeating the obtaining, checking, and indicating while receiving the streaming media, such that the repeating comprises:
   repeating the obtaining and checking at a first interval of time if a program having a particular identity is executing on the device; and
   repeating the obtaining and checking at a second interval of time if the program having the particular identity is not executing on the device, such that the second interval of time is shorter than the first interval of time.

2. A method as recited in claim 1, wherein the current overall resource usage of the resource of the device comprises usage of the resource by all threads running on the device.

3. A method as recited in claim 1, further comprising:
   checking whether the streaming media is at a lowest quality level for the streaming media;
   and indicating to reduce the quality level only if the streaming media is not at the lowest quality level for the streaming media.

4. A method as recited in claim 1, wherein the streaming media has multiple quality levels ranging in an order from a highest quality level to a lowest quality level, and wherein indicating to reduce the quality level of the streaming media comprises indicating to reduce the quality level of the streaming media by one level in the order.

5. A method as recited in claim 1, wherein the resource comprises a central processing unit (CPU), and the current overall resource usage comprises an overall CPU usage.

6. A method as recited in claim 1, wherein the resource comprises a memory, and the current overall resource usage comprises an overall memory usage.

7. A method as recited in claim 1, further comprising indicating to the source system to reduce the quality level if the resource threshold value is not met but a quality level determined based on available network bandwidth is lower than the current quality level.

8. A method as recited in claim 1, further comprising:
   checking, after the quality level of the streaming media has been reduced, whether the current overall usage of the resource at a subsequent time exceeds the threshold value; and
   indicating, to the source system, to further reduce the quality level of the streaming media if the current overall usage of the resource at the subsequent time exceeds the resource threshold value.

9. A method as recited in claim 1, further comprising:
   checking, at a third interval of time after the quality level of the streaming media has been reduced, whether there is sufficient resource capacity of the resource to increase the quality level; and
   indicating, to the source system, to increase the quality level of the streaming media if there is sufficient resource capacity of the resource to increase the quality level.

10. A method as recited in claim 9, wherein checking whether there is sufficient resource capacity of the resource to increase the quality level comprises:
generating an expected resource usage value by adding:
a current resource usage of the resource by all threads running in the device other than a streaming media playback thread that is managing streaming media playback at the device,
a resource usage of the resource by the streaming media playback thread when previously receiving the streaming media at the current quality level, and a buffer value;
comparing the expected resource usage value to the resource threshold value; and
determining that there is sufficient resource capacity of the resource to increase the quality level if the expected resource usage value exceeds the resource threshold value, and otherwise determining that there is not sufficient resource capacity of the resource to increase the quality level.

11. A method as recited in claim 9, wherein checking whether there is sufficient resource capacity of the resource to increase the quality level comprises:
generating an expected resource usage value by adding:
a current resource usage of the resource by all threads running in the device other than a streaming media playback thread that is managing streaming media playback at the device, and
a resource usage of the resource by the streaming media playback thread when previously receiving the streaming media at the current quality level;
comparing the expected resource usage value to a particular threshold value that is greater than the resource threshold value; and
determining that there is sufficient resource capacity of the resource to increase the quality level if the expected resource usage value exceeds the particular threshold value, and otherwise determining that there is not sufficient resource capacity of the resource to increase the quality level.

12. A method as recited in claim 9, wherein the streaming media has multiple quality levels ranging in an order from a highest quality level to a lowest quality level, and wherein indicating to increase the quality level of the streaming media comprises indicating to increase the quality level of the streaming media by one level in the order.

13. A method as recited in claim 1, further comprising:
associating the current overall resource usage of the resource of the device with the current quality level;
saving the associated current overall resource usage and current quality level to a record;
and where repeating further comprises repeating the associating and saving.

14. A method as recited in claim 13, wherein the indicating is based at least in part on the record.

15. One or more computer storage media having stored thereon multiple instructions that, when executed by one or more processors of a computing device, cause the one or more processors to:
determine, while receiving streaming media from a source system, whether a current overall resource usage of a resource of the computing device exceeds a resource threshold value;
indicate, to the source system to reduce a quality level of the streaming media from a current quality level if the current overall resource usage of a resource of the computing device exceeds a resource threshold value; and
perform the determination and indication again after a first predetermined period of time when a program having a particular identity is executing on the device while receiving the streaming media; and
perform the determination and indication again after a second predetermined period of time when the program having the particular identity is not executing on the device, such that the second predetermined period of time is shorter than the first predetermined period of time.

16. One or more computer storage media as recited in claim 15, wherein the resource comprises a central processing unit (CPU), and the current overall resource usage comprises an overall CPU usage.

17. One or more computer storage media as recited in claim 15, wherein the streaming media has multiple quality levels ranging in an order from a highest quality level to a lowest quality level, and wherein to indicate to reduce the quality level of the streaming media is to indicate to reduce the quality level of the streaming media by one level in the order.

18. One or more computer storage media as recited in claim 15, wherein the multiple instructions further cause the one or more processors to indicate to the source system to reduce the quality level if the resource threshold value is not met but a quality level determined based on available network bandwidth is lower than the current quality level.

19. One or more computer storage media as recited in claim 15, wherein the multiple instructions further cause the one or more processors to:
check, after the quality level of the streaming media has been reduced, whether there is sufficient resource capacity of the resource to increase the quality level; and
indicate, to the source system, to increase the quality level of the streaming media if there is sufficient resource capacity of the resource to increase the quality level.

20. A method implemented in a device including a central processing unit (CPU), the method comprising:
determining, while receiving streaming media from a source system, whether a current overall CPU usage exceeds a threshold value, such that the current overall CPU usage comprises CPU usage by all threads running on the device;
indicating, to the source system to reduce a quality level of the streaming media if the current overall CPU usage exceeds the threshold value;
subsequently determining, after a particular interval and while receiving the streaming media from the source system, whether a new current overall CPU usage exceeds the threshold value, such that the particular interval comprises a first predetermined period of time when a program having a particular identity is executing on the device, and the particular interval comprises a second predetermined period of time when the program having the particular identity is not executing on the device, such that the second predetermined period of time is shorter than the first predetermined period of time;
checking whether there is sufficient CPU capacity to increase the quality level of the streaming media, such that the checking is based at least in part on the new current overall CPU usage, an amount of CPU usage of a streaming media playback thread when receiving the streaming media prior to indicating to the source system to reduce the quality level of the streaming media, and a filter value;
indicating, if there is sufficient CPU capacity to increase the quality level of the streaming media, to the source system to use a quality level for the media streaming that is based at least in part on available bandwidth of a network between the source system and the device; and indicating, if there is not sufficient CPU capacity to increase the quality level of the streaming media, to use the lower of the reduced quality level of the streaming media and the quality level for the media streaming that is based at least in part on available bandwidth of the network.

\* \* \* \* \*